United States Patent
Román et al.

(10) Patent No.: US 8,608,247 B2
(45) Date of Patent: Dec. 17, 2013

(54) DEVICES FOR SEAT BELT SHOULDER STRAP COMFORT AND SAFETY

(76) Inventors: Kendyl A. Román, Sunnyvale, CA (US); Cara Schwartz, San Jose, CA (US)

( * ) Notice: Subject to any disclaimer, the term of this patent is extended or adjusted under 35 U.S.C. 154(b) by 337 days.

(21) Appl. No.: 12/943,809

(22) Filed: Nov. 10, 2010

(65) Prior Publication Data
US 2012/0112516 A1   May 10, 2012

(51) Int. Cl.
*B60R 22/30* (2006.01)
(52) U.S. Cl.
USPC ............... 297/483; 297/468; 280/808
(58) Field of Classification Search
USPC .......... 297/483, 468; 280/808; 24/198, 199, 24/200
See application file for complete search history.

(56) References Cited

U.S. PATENT DOCUMENTS

| | | | | |
|---|---|---|---|---|
| 4,038,726 A | * | 8/1977 | Takabayashi | 24/198 |
| 4,786,078 A | * | 11/1988 | Schreier et al. | 280/808 |
| 5,201,099 A | * | 4/1993 | Campbell | 24/198 |
| 5,215,333 A | * | 6/1993 | Knight | 280/801.1 |
| 5,395,136 A | * | 3/1995 | Buchner | 280/801.1 |
| 5,706,560 A | * | 1/1998 | Anscher et al. | 24/543 |
| 6,293,589 B1 | * | 9/2001 | MacDonald et al. | 280/808 |
| 7,657,977 B2 | * | 2/2010 | Clifton, Jr. | 24/170 |
| 8,146,946 B1 | * | 4/2012 | Emond | 280/801.1 |

* cited by examiner

*Primary Examiner* — Sarah B McPartlin (57) ABSTRACT

Seat belt shoulder strap comfort and safety devices provide increased comfort and safety for the user. Embodiments of adjustable clips allow positioning of the clip on the seat belt shoulder strap away from the neck and onto the torso minimizing neck or head injury in an accident or near accident also allowing for focus to be maintained on the road or matters that require attention. Embodiments of two channeled clips provide one channel for the shoulder strap and another channel for the waist strap and are designed to guide the should strap in a comfortable direction while reducing the force on the adjustable clip and the passenger. Embodiments of adjustable clips with locking mechanism are combined with a two channeled clip for optimum safety, comfort, and durability. Some embodiments allow for easy installation and removal or adjustment, which allows the seat belt to be fully retracted and not left dangling.

20 Claims, 5 Drawing Sheets

DEVICES FOR SEAT BELT SHOULDER STRAP COMFORT AND SAFETY

BACKGROUND

1. Field of the Invention

The present invention relates to seat belts used in automobiles, in particular the invention relates to an adjustable, lightweight, comfortable, portable, low cost seat belt shoulder strap clips and devices which comfort and safety.

2. Description of Prior Art

Automobile seat belts are designed for individuals of average height. Short adults or children, on the other hand, sit lower on the seat and consequently have the shoulder straps of the safety seat belts resting on the side of their neck causing discomfort by putting pressure on the neck and posing a safety risk for a neck or head injury in an accident or near accident.

Attempts have been made to rectify this problem. Sheepskin or artificial fur shoulder pads wrap around the shoulder strap portion of the seat belt at the location where the shoulder strap meets the neck. These pads rest on the neck of the passenger merely masking the issue of discomfort and don't alter the position of the shoulder strap, which leaves the passenger susceptible to neck or head injury in an accident or near accident. In addition, they prevent the seat belt from fully retracting leaving it dangling which can cause potential damage to the seat belt by having it caught in the door. Clips have also been used to adjust the position of the shoulder strap away from the neck and onto the torso. While they achieve repositioning of the shoulder strap, they are inconvenient and prone to human error because they have to be removed and reapplied every time the seat belt is used.

SUMMARY OF THE INVENTION

Accordingly, it is an objective of the present invention to provide a device for seat belt shoulder comfort and safety that eliminates the discomforts of existing seat belt shoulder straps in vehicles while improving comfort and safety. The various embodiments include an adjustable clip and two channel adjustable clips that increase passenger comfort and maintain safety.

Objects and Advantages

Accordingly, the present invention includes the following advantages:

a) To provide an adjustable seat belt shoulder strap adjustment device.
b) To provide increased comfort by positioning an adjustable clip on a seat belt such that the shoulder strap is positioned away from the neck and onto the torso.
c) To provide increased safety by positioning an adjustable clip on a seat belt such that the shoulder strap is positioned away from the neck and onto the torso minimizing neck or head injury in an accident or near accident and allowing for focus to be maintained on the road or matters that require attention.
d) To provide increased ability to relax by positioning an adjustable clip on a seat belt to the desired position.
e) To provide an easy to use seat belt shoulder comfort and safety strap.
f) To provide an easy to install seat belt shoulder comfort and safety strap.
g) To provide an easy to uninstall seat belt shoulder comfort and safety strap.
h) To provide an easy to transport seat belt shoulder comfort and safety strap.
i) To provide an inexpensive seat belt shoulder comfort and safety strap.
j) To provide a lightweight seat belt shoulder comfort and safety strap.
k) To provide an easy to store seat belt shoulder comfort and safety strap.
l) To provide a simple way to manufacture seat belt shoulder comfort and safety straps.
m) To provide an inexpensive way to manufacture seat belt shoulder comfort and safety straps.

REFERENCE NUMERALS IN DRAWINGS

| | |
|---|---|
| 2 | passenger |
| 4 | neck |
| 6 | seat belt |
| 8 | shoulder strap |
| 10 | waist strap |
| 12 | buckle |
| 14 | buckle release button |
| 16 | buckle inserting end |
| 18 | seat |
| 20 | headrest |
| 22 | door jam |
| 24 | adjustable clip |
| 26 | anchor |
| 28 | thumb release |
| 29 | front piece |
| 30 | latch top |
| 31 | back piece |
| 32 | latch top receiving end |
| 34 | double latch |
| 36 | spring |
| 38 | shoulder channel |
| 40 | waist channel |
| 42 | two channeled clip |
| 44 | slide release button |
| 48 (a-b) | lock position |
| 50 (a-b) | channel slot |
| 52 | latch lever |

DESCRIPTION OF THE INVENTION

Seat Belt Safety and Comfort

Figures 1, 2:
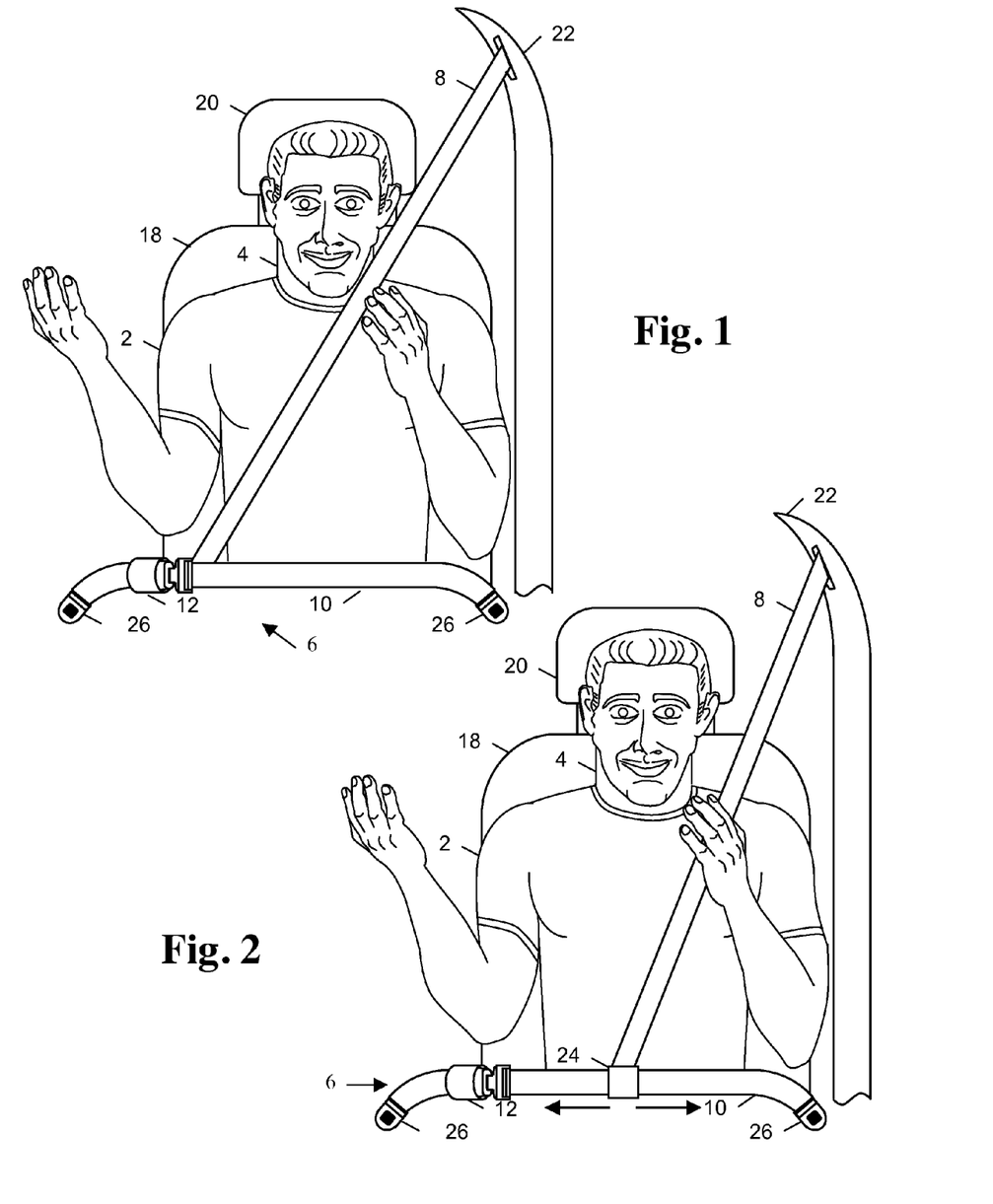
FIG. 1 shows how shoulder straps on safety seat belts hit a short person in the side of the neck.
FIG. 2 shows an adjustable clip that can be adjusted to change the angle of the shoulder strap to take it off of the neck and ensure that the strap is safely placed across the torso.

Shoulder straps on safety seat belts hit a short person in the side of the neck. FIG. 1 shows a short passenger 2 sitting in seat 18 with a headrest 20 that is buckled into seat belt 6 comprising shoulder strap 8, waist strap 10, buckle 12 and anchors 26. Given the angle at which the shoulder strap 8 attaches from door jam 22 to buckle 12 coupled with the height of passenger 2, the shoulder strap 8 rests upon the neck 4 of passenger 2. Not only is this uncomfortable for passenger 2, but is also prone to causing neck or head injury in an accident or near accident by the shoulder strap.

Adjustable Clip

FIG. 2 is similar to FIG. 1, but introduces an adjustable clip 24 that can be moved along shoulder strap 8 and waist strap 10 to change the angle of the shoulder strap 8 to take it from resting on neck 4 to placing it safely across the passenger's 2 torso. The left and right sides of the vehicle are preferably symmetrical, minor images.

Figure 3A:
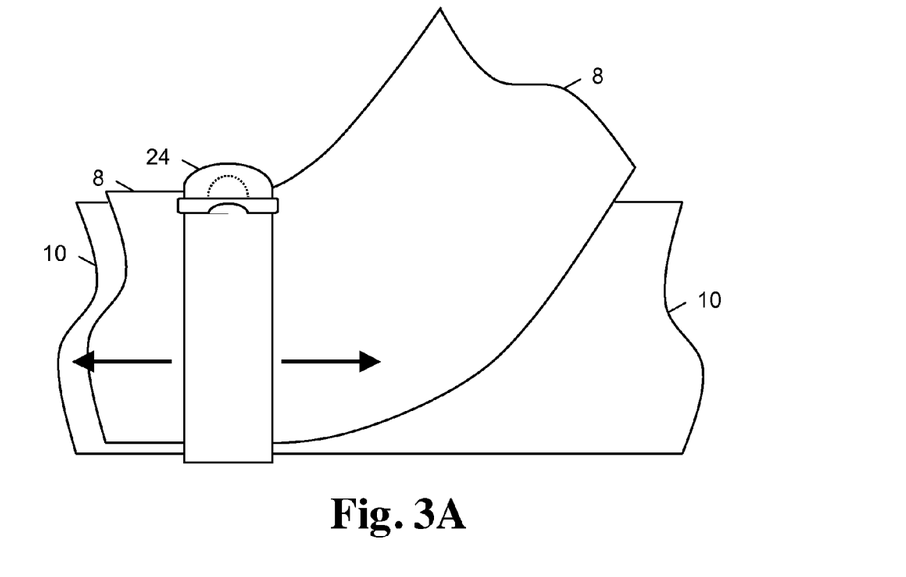
FIGS. 3A-3C show various views of embodiments of an adjustable clip.

FIG. 3A shows a front view of an embodiment of an adjustable clip 24 installed on shoulder strap 8 and waist strap 10. It may be adjusted vertically along both shoulder strap 8 and waist strap 10 and locked down around straps 8 and 10 at the desired position.

Figure 3B:
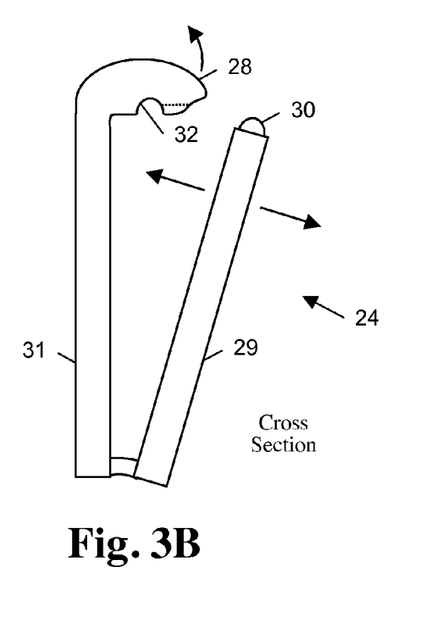

FIG. 3B shows a side view cross section of the adjustable clip 24 embodiment of FIG. 3A. To close and lock the adjustable clip 24 around shoulder strap 8 (not shown) and waist strap 10 (not shown), the front piece 29 with latch top 30 slides under the thumb release 28 and snaps into the latch top receiving end 32 on back piece 31. To release and open, the thumb release 28 is lifted up providing clearance for the latch top 30 to be removed from the latch top receiving end 32. The front piece 29 can then be opened.

Figure 3C:
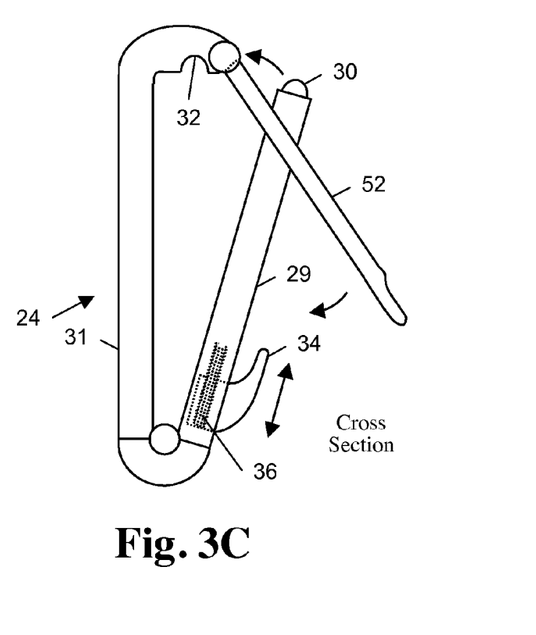

FIG. 3C shows a more complex embodiment of adjustable clip 24 with two levers instead of one. The adjustable clip is preferably made from a strong, lightweight material such as metal. Front piece 29 contains a spring 36 and a double latch 34. As in FIG. 3B, the front piece 29 with latch top 30 slides under the top and snaps into the latch top receiving end 32 on back piece 31. In addition, latch lever 52 folds down over front piece 29 and snaps into the double latch 34 on front piece 29. This provides a more secure hold of the adjustable clip 24 in an accident or near accident while still maintaining ease of movement and adjustment.

To remove, the double latch 34 is lowered by asserting a force opposing the spring 36. This frees the latch lever 52 which in turn frees the front piece 29.

Two Channel Clip

Figure 4A:
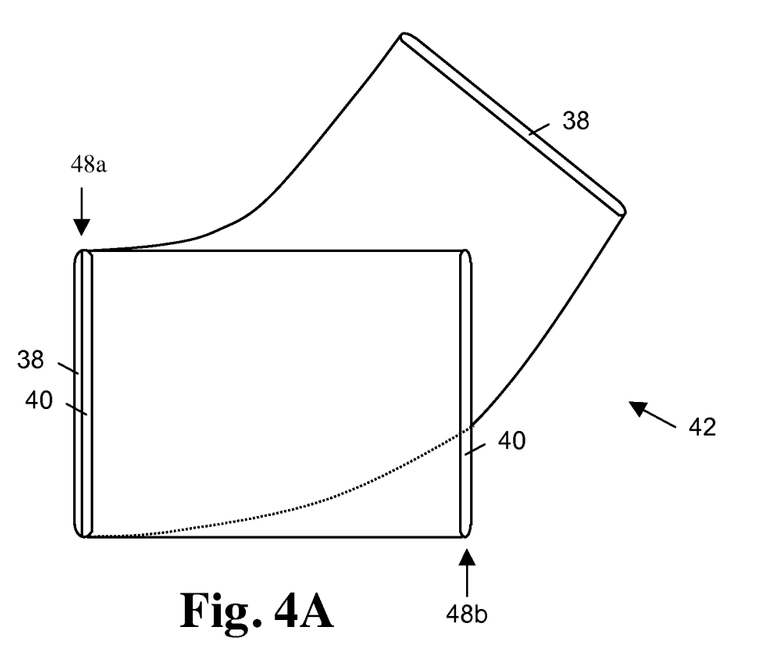
FIGS. 4A and 4B show embodiments of two channeled clips having a channel for each strap portion.
Figure 4B:
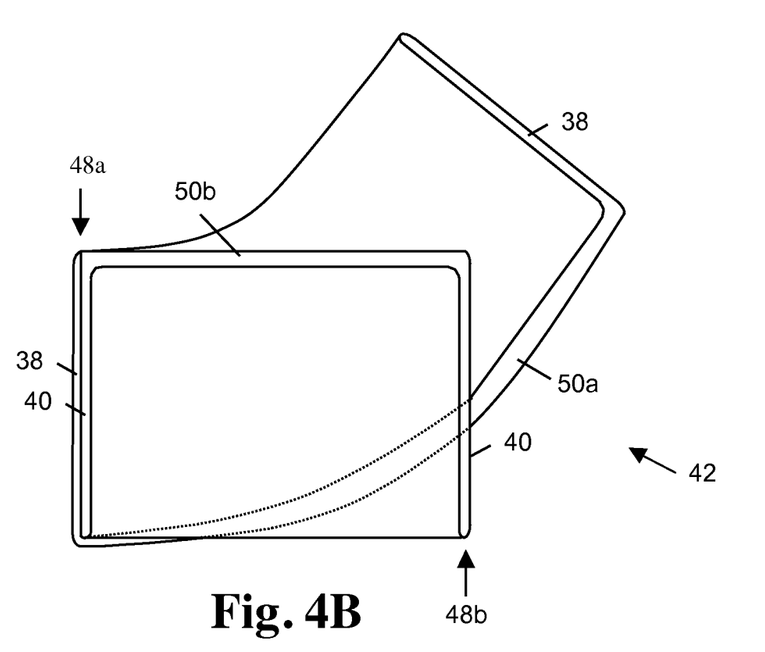
Figure 5:
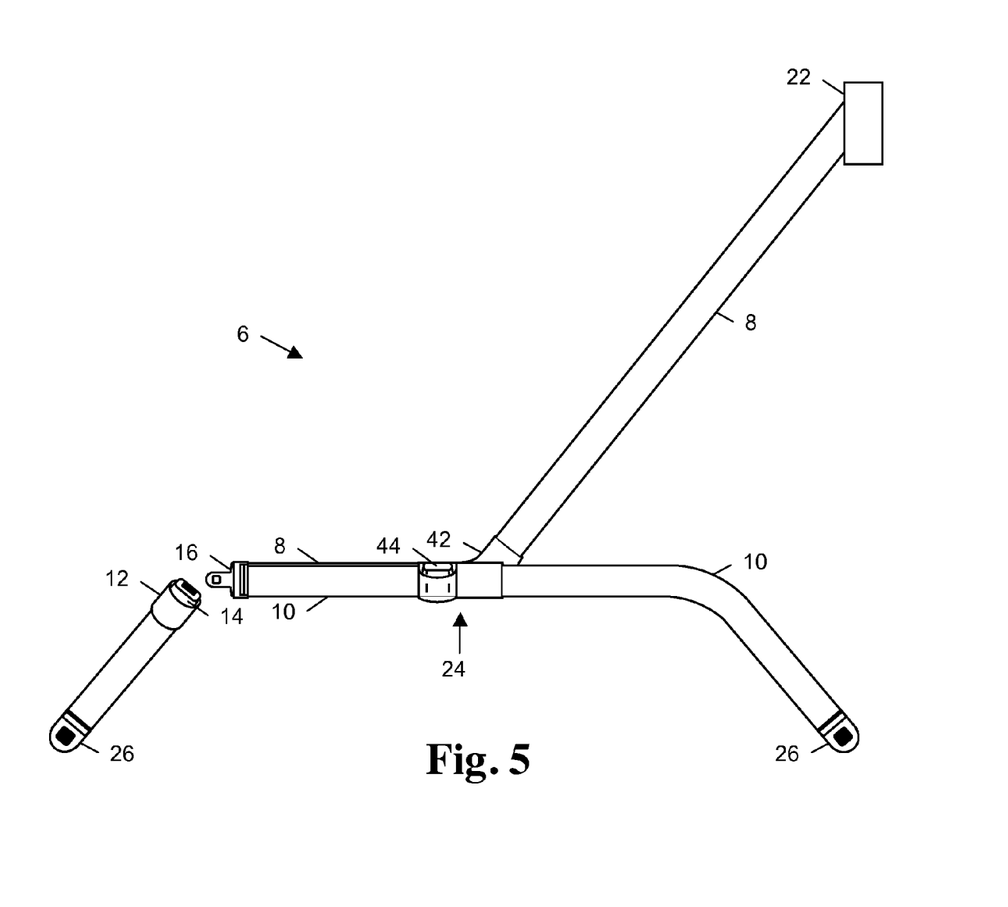
FIG. 5 shows an alternative embodiment where the adjustable clip is similar in design to the belt release.
Figure 6:
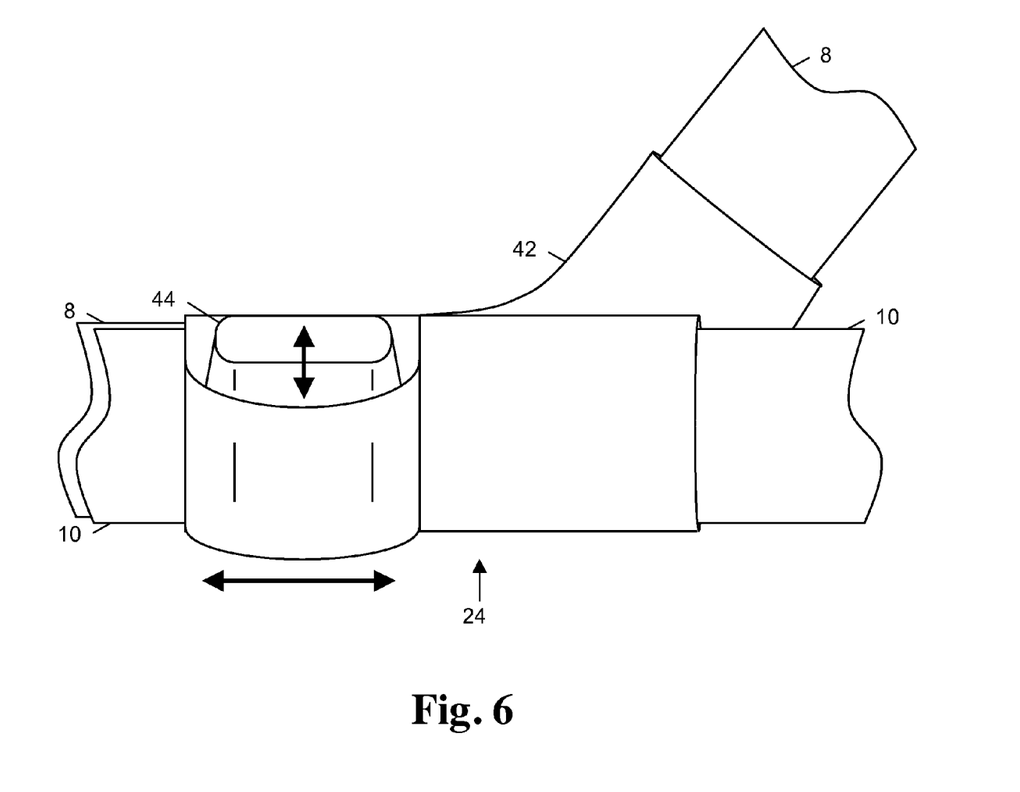
FIG. 6 is a detailed view of the adjustable clip in FIG. 5.

FIGS. 4A and 4B show embodiments of two channeled clips 42 having a shoulder channel 38 and a waist channel 40 for shoulder strap 8 and waist strap 10, respectively. Each two channeled clip 42 can be used independently, or preferably as in combination with the a locking mechanism, for example as part of adjustable clips 24 as shown in FIGS. 5 and 6.

In FIG. 4A, shoulder strap 8 (not shown) and waist strap 10 (not shown) slide inside and through shoulder channel 38 and a waist channel 40, respectively. The shoulder channel 38 directs the shoulder strap 8 to a comfortable angle. The two channeled clip 42 holds the shoulder strap 8 (not shown) and waist strap 10 together. When a vehicle decelerates the two channeled clip 42 absorbs the force of two portions of the seat belt (8 and 10) making it less likely for the position of the clip to move, and protecting the passenger 2 from harm.

In FIG. 4B, the shoulder channel 38 and the waist channel 40 are enclosed such that the shoulder strap 8 (not shown) and waist strap 10 (not shown) must be passed through the two channeled clip 42 during manufacture or installation of the seat beat in the vehicle.

In FIG. 4B, shoulder channel 38 and a waist channel 40 have channel slots 50a and 50b, respectively. The shoulder strap 8 (not shown) and waist strap 10 (not shown) slide into shoulder channel 38 and a waist channel 40, respectively, through the channel slots 50a and 50b, respectively. The embodiment of FIG. 4B can be added as a after market device. It can easily be installed and removed at any time.

These embodiments each reduce the force on the adjustable clip 24. Any locking mechanism could be used in the locations with lock positions 48a-b. The locking mechanism could be integrated or separate.

Adjustable Clip with Two Channel Clip

FIG. 5 shows an alternative embodiment where the adjustable clip 24 is similar in design to the belt release (buckle 12 with buckle release button 14). The adjustable clip 24 with a two channeled clip 42 is installed on seat belt 6 comprising shoulder strap 8, waist strap 10, buckle 12 and anchors 26. When the slide release button 44 is depressed the adjustable clip 24 with two channeled clip 42 will slide horizontally along both the shoulder strap 8 and waist strap 10. When the slide release button 44 is released the adjustable clip 24 will lock in place.

When a passenger wants to release the belt they would depress the slide release button 44 and slide the adjustable clip 24 with two channeled clip 42 toward the buckle inserting end 16 and then press the buckle release button 14 on the buckle 12. This allows the entire seat belt 6 to be retracted into the door jam 22.

Upon reentry of the vehicle the passenger(s) 2 would insert the buckle inserting end 16 into the buckle 12, and then depress the slide release button 44 and slide the adjustable clip 24 with two channeled clip 42 away from the buckle inserting end 16 until the desired position is reached. When the slide release button 44 is released the adjustable clip 24 with two channeled clip 42 would lock into place.

The left and right sides of the vehicle are preferably symmetrical, minor images.

FIG. 6 is a detailed view of the adjustable clip 24 with two channeled clip 42 in FIG. 5. Preferably the two channeled clip 42 has enclosed channels as shown in FIG. 4A. Preferably the seat belt assembly is manufactured with the adjustable clip 24 with two channeled clip 42. The slide release button 44 preferably matches the design style of the buckle release button 14 of the same assembly (FIG. 5).

These embodiments decrease the extent of seat belt injury to the wearer due to better fit.

Advantages

Adjustable

The preferred embodiments of these improved seat belt shoulder comfort and safety straps with clips are adjustable to provide greater comfort for a wide variety of passenger weights and sizes.

Increased Comfort

The configurability and adjustability of the embodiments provides increased comfort through changing the angle of the shoulder strap to rest squarely on the torso instead of the neck.

Increased Safety

The configurability and adjustability of the embodiments provides increased comfort through changing the angle of the shoulder strap to rest squarely on the torso instead of the neck minimizing any neck or head injury in an accident or near accident. The increased comfort also takes the mind off the seat belt and allows for focus to be maintained on the road or matters that require attention, further increasing safety.

Increased Ability to Relax

The configurability and adjustability of the embodiments provides increased comfort through changing the angle of the shoulder strap to the desired position increasing the ability to relax.

Easy to Use

These seat belt shoulder comfort and safety straps are ideal for people, groups of people, and organizations, such as taxi cab companies, schools and churches, who transport short people and prefer a low maintenance and low cost seat belt shoulder comfort and safety strap. Some embodiments of seat belt shoulder comfort and safety devices can be installed and removed by the purchaser. Seat belt shoulder comfort and safety devices can also be adjusted by the purchaser or the user.

Easy to Install

These seat belt shoulder comfort and safety devices can be easily installed by the purchaser, or by the manufacturer.

Easy to Uninstall

Some embodiments of the seat belt shoulder comfort and safety devices can be easily uninstalled by the purchaser to transfer to another safety belt or to store away.

Easy to Transport

Some embodiments of the seat belt shoulder comfort and safety devices are compact and easy to transport from one safety belt to another.

Low Cost

These seat belt shoulder comfort and safety devices are low cost. They can be made with less material than the existing seat belt shoulder comfort and safety straps.

Lightweight

These seat belt shoulder comfort and safety devices are lightweight.

Easy to Store

These seat belt shoulder comfort and safety devices are easy to store.

Simple to Make and Manufacture

These seat belt shoulder comfort and safety straps are easy to make or to manufacture, having a simple set of parts and configuration.

Inexpensive to Make and Manufacture

These seat belt shoulder comfort and safety straps are easy to make or to manufacture, having a simple set of parts and configuration thus making them inexpensive to manufacture.

Easy to Ship

These seat belt shoulder comfort and safety straps can be shipped easily.

Conclusion, Ramification, And Scope

Accordingly, the reader will see that the improved adjustable, lightweight, portable, low cost seat belt shoulder comfort and safety devices are easy to use and transport.

While the above descriptions contain several specifics these should not be construed as limitations on the scope of the invention, but rather as examples of some of the preferred embodiments thereof. Many other variations are possible. For example, the devices and strap assemblies can be manufactured in different ways and/or in different shapes or styles to reduce material and simplify manufacturing. The variations could be used without departing from the scope and spirit of the novel features of the present invention.

Accordingly, the scope of the invention should be determined not by the illustrated embodiments, but by the appended claims and their legal equivalents.

What is claimed is:

1. A seat belt system for use in a vehicle with one or more passengers, each passenger having a waist, a torso, and a neck, the seat belt system comprising:
   a) a buckle, having:
      i) a buckle inserting end, and
      ii) a buckle receiving end,
   b) a seat belt strap, having two strap portions:
      i) a shoulder strap, and
      ii) a waist strap,
   c) a means for attaching a first end of the waist strap to the vehicle,
   d) a means for attaching a first end of the shoulder strap to the vehicle, and
   e) an adjustable clip, comprising:
      i) a waist channel,
      ii) a shoulder channel,
      iii) a means for locking the adjustable clip in a fixed position, and
      iv) slide release button,
   wherein a second end of the waist strap is connected to the buckle,
   wherein a second end of the shoulder strap is connected to the buckle,
   wherein the adjustable clip is attached to both the shoulder strap and the waist strap between the first and second ends of the waist strap and between the first and second ends of the shoulder strap,
   wherein, when the seat belt system is secured across the waist of at least one passenger, the adjustable clip is slid horizontally to adjust a position of the shoulder strap relative to the torso of the passenger,
   wherein the position of the shoulder strap is off of the neck and is diagonally across the torso,
   wherein the waist strap passes through the waist channel,
   wherein the shoulder strap passes through the shoulder channel,
   wherein the shoulder strap is guided away from the waist strap at angle,
   wherein the channels of the adjustable clip restrain the position of the waist strap and the shoulder strap when forces are applied to the waist strap and the shoulder strap,
   wherein the waist channel and the shoulder channel are closed,
   wherein when the slide release button is depressed the means for locking the adjustable clip in the fixed position is released so the adjustable clip is free to slide along the waist strap, and
   wherein when the slide release button is released the means for locking the adjustable clip in the fixed position locks the adjustable clip at the fixed position.

2. The system of claim 1, wherein the buckle further comprises a buckle release button, and
   a) wherein the slide release button and the buckle release button have the same appearance.

3. The system of claim 1, wherein the buckle further comprises a buckle release button, and
   a) wherein the slide release button and the buckle release button have the same orientation.

4. A method of using the system of claim 1, comprising the steps of:
   a) sitting in the vehicle,
   b) placing the waist strap across the waist,
   c) buckling the buckle,
   d) depressing the slide release button and sliding the adjustable clip to a desired location such that the shoulder strap is off of the neck, and
   e) releasing the slide release button locking the adjustable clip at the fixed position.

5. The method of claim 4, further comprising the steps of:
   f) depressing the slide release button and sliding the adjustable clip toward the buckle,
   g) depressing the buckle release button to release the buckle, and
   h) exiting the vehicle.

6. An adjustable clip for use with a seat belt system in a vehicle with one or more passengers, each passenger having a waist, a torso, and a neck, the seat belt system comprising:
   a) a buckle, having a buckle release button, and
   b) a seat belt strap, having two strap portions:

i) a shoulder strap, connected to the buckle, and
ii) a waist strap, connected to the buckle;
the adjustable clip comprising:
(1) a waist channel, and
(2) a shoulder channel,
wherein the waist channel is configured to receive the waist strap,
wherein the shoulder channel is configured to receive the shoulder strap,
wherein the shoulder channel is configured having a curve to guide the shoulder strap away from the waist strap at an angle,
wherein the adjustable clip is configured to slide horizontally along the waist strap to adjust a position of the shoulder strap relative to the torso of the passenger,
wherein the waist channel comprises a top edge, a bottom edge, a front plate and a back plate,
wherein the shoulder channel comprises a top edge, a bottom edge, a front plate and a back plate,
wherein the respective front plates and back plates are substantially flat and are configured to allow the respective portions of the seat belt strap to slide through the respective channels, and
wherein the channels of the adjustable clip restrain the position of the waist strap and the shoulder strap when forces are applied to the waist strap and the shoulder strap.

7. The adjustable clip of claim 6,
wherein a waist channel slot provides an opening on the top edge of the waist channel,
wherein a shoulder channel slot provides an opening on the bottom edge of the shoulder channel,
wherein the slots allow for insertion and removal of the respective portions of the seat belt strap, and
wherein, when the vehicle decelerates, the forces of the respective portions of the seat belt strap keep the seat belt strap in the respective open channels.

8. The adjustable clip of claim 6, further comprising:
(3) a lock for locking the adjustable clip in a fixed position in relation to the seat belt strap, and
(4) a slide release button for releasing the lock,
wherein, when the slide release button is depressed, the lock is released so the adjustable clip is free to slide along the waist strap, and
wherein, when the slide release button is released, the lock locks the adjustable clip at the fixed position.

9. The adjustable clip of claim 8,
wherein the slide release button is configured to have substantially the same appearance as the buckle release button.

10. The adjustable clip of claim 8,
wherein the slide release button is configured to have substantially the same orientation as the buckle release button.

11. A method of using the adjustable clip of claim 8, comprising the steps of:
a) sitting in the vehicle,
b) placing the waist strap across the waist,
c) buckling the buckle,
d) depressing the slide release button and sliding the adjustable clip to a desired location such that the shoulder strap is off of the neck, and
e) releasing the slide release button locking the adjustable clip at the fixed position.

12. The method of claim 11, further comprising the steps of:
f) depressing the slide release button and sliding the adjustable clip toward the buckle,
g) depressing the buckle release button to release the buckle, and
h) exiting the vehicle.

13. A method of using the adjustable clip of claim 6, comprising the steps of:
a) sitting in the vehicle,
b) placing the waist strap across the waist,
c) buckling the buckle,
d) sliding the adjustable clip to a desired location such that the shoulder strap is off of the neck.

14. The method of claim 13, further comprising the steps of:
e) sliding the adjustable clip toward the buckle,
g) depressing the buckle release button to release the buckle, and
h) exiting the vehicle.

15. The adjustable clip of claim 6,
wherein a height of the waist channel from the top edge to the bottom edge is configured to be a size at least a height of the horizontal waist strap.

16. The adjustable clip of claim 15,
wherein a length of the waist channel is configured to be at least said size.

17. The adjustable clip of claim 15,
wherein a height of the shoulder channel from the top edge to the bottom edge is configured to be at least said size.

18. The adjustable clip of claim 15,
wherein the length of an outside curve of the shoulder channel is configured to be at least twice said size.

19. An adjustable clip for use with a seat belt system for a passenger having a torso, the seat belt system comprising:
a) a buckle, and
b) a seat belt strap, having two strap portions:
i) a shoulder strap, connected to the buckle, and
ii) a waist strap, connected to the buckle;
the adjustable clip comprising:
(1) a waist channel, and
(2) a shoulder channel,
wherein the waist channel is configured to receive the waist strap,
wherein the shoulder channel is configured to receive the shoulder strap,
wherein the shoulder channel is configured to guide the shoulder strap away from the waist strap,
wherein the adjustable clip is configured to slide horizontally along the waist strap to adjust a position of the shoulder strap relative to the torso of the passenger,
wherein the waist channel comprises a top edge, a bottom edge, a front plate and a back plate,
wherein the shoulder channel comprises a top edge, a bottom edge, a front plate and a back plate,
wherein the respective front plates and back plates are substantially flat and are configured to allow the respective portions of the seat belt strap to slide through the respective channels, and
wherein the channels of the adjustable clip restrain the position of the waist strap and the shoulder strap when forces are applied to the waist strap and the shoulder strap.

20. The adjustable clip of claim 19,
wherein a waist channel slot provides an opening on the top edge of the waist channel,
wherein a shoulder channel slot provides an opening on the bottom edge of the shoulder channel, wherein the slots allow for insertion and removal of the respective portions of the seat belt strap, and wherein, when forces are applied to the passenger, the forces of the respective portions of the seat belt strap keep the seat belt strap in the respective open channels.

* * * * *